Oct. 4, 1966     F. D. WERNER     3,277,459
CONDUCTIVITY-TYPE ICE DETECTOR
Filed Nov. 19, 1963     2 Sheets-Sheet 1
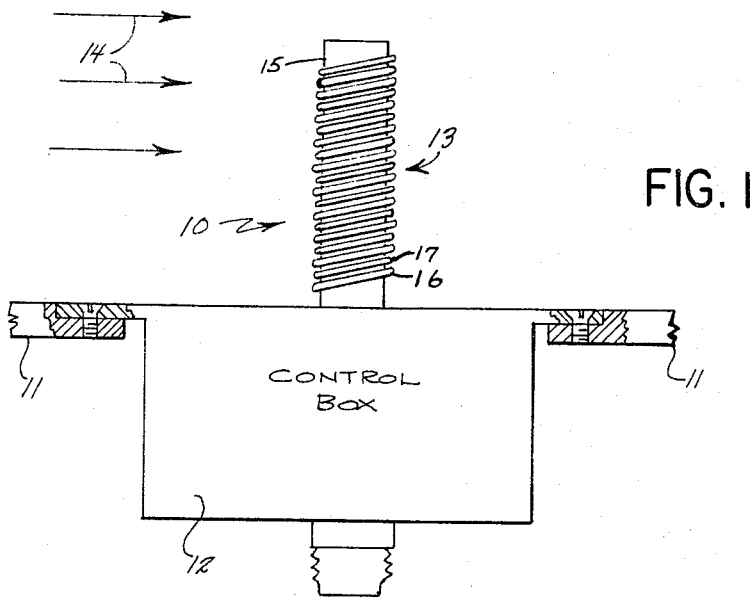
FIG. 1
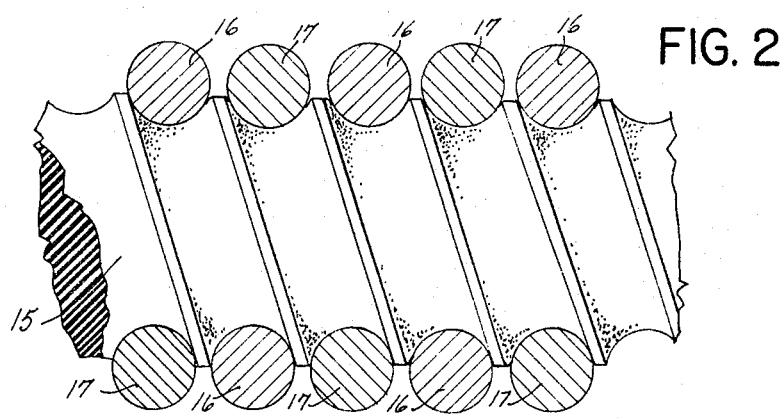
FIG. 2
FIG. 3
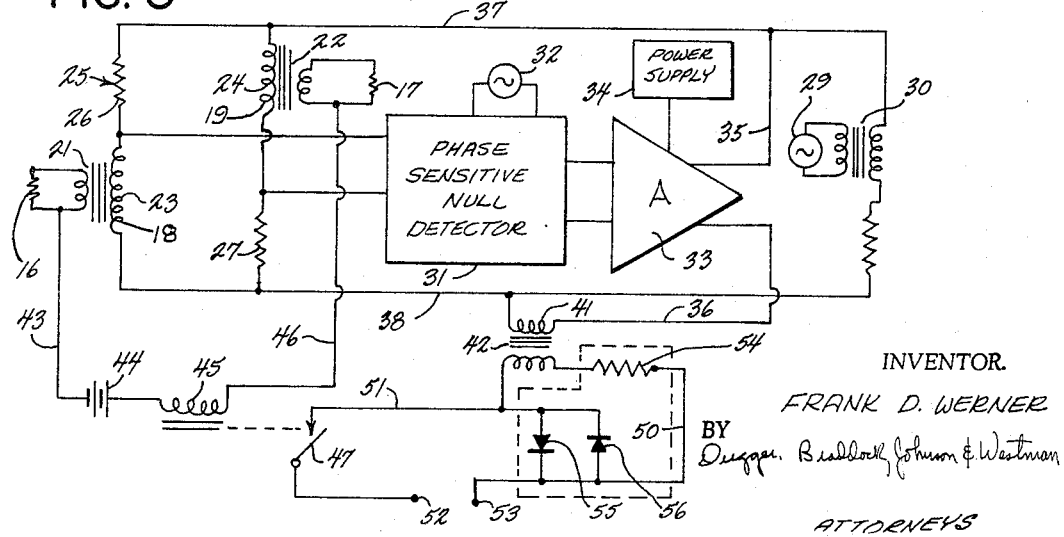
INVENTOR.
FRANK D. WERNER
BY
Dugger, Bradlock, Johnson & Westman
ATTORNEYS Oct. 4, 1966    F. D. WERNER    3,277,459
CONDUCTIVITY-TYPE ICE DETECTOR
Filed Nov. 19, 1963    2 Sheets-Sheet 2
FIG. 5
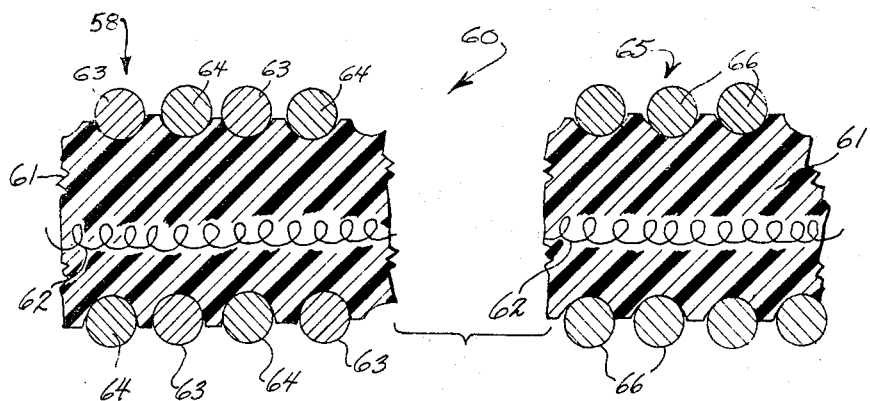
FIG. 6
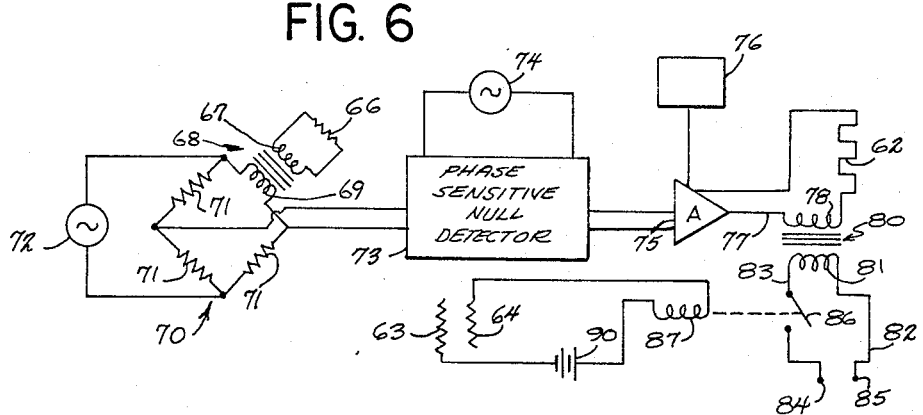
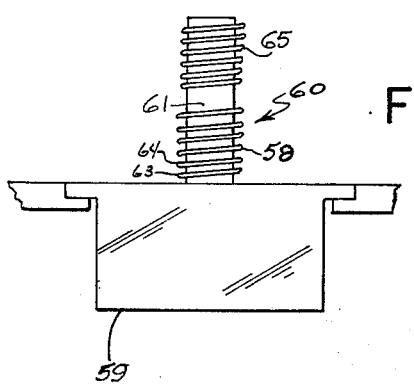
FIG. 4
INVENTOR.
FRANK D. WERNER
BY
Dugger, Braddock, Johnson & Westman
ATTORNEYS

3,277,459
CONDUCTIVITY-TYPE ICE DETECTOR
Frank D. Werner, Minneapolis, Minn., assignor to Rosemount Engineering Company, Minneapolis, Minn., a corporation of Minnesota
Filed Nov. 19, 1963, Ser. No. 324,709
8 Claims. (Cl. 340—234)

The present invention has relation to ice detectors and more particularly to a conductivity-type ice detector which provides a warning for the existence of icing conditions with accuracy and reliability.

There have been many ice detectors advanced which utilize many different principles of operation. All of the ice detectors which have been advanced up-to-date have serious drawbacks, either because of large expense involved in manufacture or because they will not function under all conditions that are encountered in aircraft. Some of the more common types of ice detectors include a pressure-type ice detector which has a probe mounted in the air flow. The probe has a small hole or slit generally facing toward the air flow and another hole facing downstream so that it is at a relatively low pressure. The upstream facing slit or port normally experiences elevated pressure and when ice occurs the ice closes or tends to close this port. The pressure drop between the two ports disappears when icing occurs and this can be utilized for activating a suitable signal. The manner in which the ice forms over the port is not always reliable. There is always a chance that the port will become plugged by frozen water or sand or dust and not function.

A differential heating type of ice detector has been advanced in which two wires are inserted into the air flow and mounted so that one of them is shielded from effects of ice or freezing water droplets and the other is not. Under icing conditions the one that is protected maintains about the same temperatures as usual and the other, the one being contacted by ice or water droplets, experiences a marked temperature drop. This type of a sensor is not satisfactory in sensing extremely small icing rates and the problem in shielding one of the wires and at the same time maintaining identical convective heat transfer coefficients for the two sensors (so that both are affected equally by normal air movement) is extremely difficult if not impossible at all conditions in which aircraft must fly.

There have been mechanical ice measurement devices in which a scraper will measure the build up of ice but this is unsuitable in that response is rather slow and many mechanical problems can be experienced. There are optical ice detectors which sense the difference in the refraction of light when a surface has become coated with ice and also vibrating sensors which change in frequency in vibration when coated with ice.

Further, there have been radiation absorption ice detectors in which alpha, beta or gamma rays are emitted from one surface and detected on another. If either or both surfaces become covered with ice additional absorbtion is introduced which can be detected and serve as an indication. These types are somewhat complex and require substantial ice build up before they respond.

The capacitive type ice detector is constructed by mounting two electrodes and measuring the change in capacitance between the electrodes when they become coated with ice. One of the problems involved with this type of device is that they are difficult to de-ice.

The present invention represents a conductivity type ice detector in which a pair of wires are wound on an insulating mandrel. The presence of water between the wires causes the resistance between the wires to decrease (the conductivity increases). The increase in conductivity is used with suitable electrical circuitry to place a signal into an indicating device. For example the increase in conductivity can be utilized for operating a suitable relay that will close a switch.

The usual conductivity type ice detector also includes a separate temperature sensor so that when the temperature is near the icing point a further signal is placed in the system. A signal indicating the presence of water on the wires and an indication that the temperature is near freezing, will cause the indicator to show that icing conditions exist.

The previous conductivity type ice detectors have had a very severe problem, in that they have used separate temperature sensors and water detectors. The temperature sensor component generally involves thermal resistance between itself and the outside air flow. Because of this thermal resistance, in the usual construction, the temperature of the sensing element itself may be higher than the temperature on the surface of the ice detector. When the temperature sensing element and water detector element in a conventional conductivity type ice detector are to be controlled at the same temperature, usually slightly above freezing, the actual temperature of the water detection component may be much less. An error of 5° C. or 10° C. may result. This is usually corrected by increasing the temperature setting of the temperature sensor, but this correction is inadequate because the temperature error depends very much on the air flow rate. Therefore the ice detector is not usable at a wide range of air speed.

In the present invention, the water detection section and the temperature sensor section are constructed so that this error is eliminated. In one form of the invention the wires which are used for indicating the presence of water are also utilized for indicating the ambient temperature and are heated when necessary to maintain the indicator at a temperature above freezing. In a second form of the invention the proble utilizes separate water detector and temperature sensor sections and a separate heater. The three elements are combined in a unique manner to eliminate the inaccuracies previously present in ice detectors. Both forms of the invention are connected to suitable control circuitry which gives a signal when there is water on the probe and the ambient temperature is at the freezing point, which indicates that icing conditions exist.

It is an object of the present invention to present a novel conductivity type ice detector.

It is a further object of the present invention to present a conductivity type ice detector in which one probe is utilized for mounting the water indicator and a temperature sensor.

It is another object of the present invention to present a conductivity type ice detector wherein the temperature sensor and water detector are maintained at substantially the same temperature at all air flows.

It is still a further object of the present invention to present a conductivity type ice detector in which the water indicator and the temperature sensor thereof are affected in identical manner by a heater provided to maintain the ice detector at temperatures above freezing.

It is another object of the present invention to present an ice detector in which one pair of wires are utilized as water detectors, temperature sensors and heating element.

It is a still further object of the present invention to present a conductivity ice detector which will sense very low icing rates.

Other and further objects of this invention are those inherent in the invention herein illustrated, described and claimed, and will become more apparent as the description proceeds.

In the drawings:

FIG. 1 is a side elevational view of an ice detector made according to a first form of the present invention showing it installed on the surface of an airplane;

FIG. 2 is a fragmentary enlarged sectional view taken as line 2—2 of FIG. 1;

FIG. 3 is a schematic representation of a typical electrical circuit utilized for controlling the ice detector of FIG. 1;

FIG. 4 is a side elevational view of an ice detector made according to a second form of the invention;

FIG. 5 is a fragmentary enlarged sectional view of a second form of an ice detector probe that will accomplish the purposes of the present invention; and FIG. 6 is a schematic representation of a circuit which may be utilized with the probe of FIG. 5.

Referring to the drawings and the numerals of reference thereon, an ice detector illustrated generally at 10 is mounted onto a panel 11, which may be the skin of an airplane or the interior panel of a duct. The ice detector includes a control box 12 for the electrical controls and an ice detector head or probe 13. The ice detector probe 13 is substantially upright and protrudes into the air flow illustrated by arrows 14. The ice detector probe extends into the air flow in which the condition of icing is to be indicated.

The ice detector probe 13 is comprised as an upright mandrel 15 made of suitable insulating material that is rigid and capable of supporting first and second wires 16 and 17, respectively, which are helically wound as a pair along the length of the mandrel 15.

FIG. 2 in particular, shows that the wires are of larger diameter than the spacing between adjacent coils. This decreases the air flow to the insulating mandrel 15. Because the air flow is impeded the cooling effect of the air on the surface of the mandrel is less than the effect of the air on the wire. It is therefore possible to apply heat necessary to maintain the probe at a temperature above freezing by passing current through the wires 16 and 17 and using them as the heater elements. Because the cooling effect of the insulating surface of the probe is substantially suppressed it will not be significantly lower than the temperature of the wires themselves. Any ice which may form will be removed from the probe when the wires are heated.

As shown, the wires 16 and 17 are placed into provided grooves on the outer surface of the mandrel. The grooves 20 are not necessary but aid in the positioning of the wires on the mandrel.

Referring specifically to FIG. 3, which is a simplified schematic illustration of the circuitry which may be used for controlling the ice detector head, it can be seen that the wires 16 and 17 are connected to the secondary windings 21 and 22, respectively, of separate transformers 23 and 24.

The wires 16 and 17 reflect resistance into the primary windings 18 and 19, respectively, of the transformers. The primary windings form two arms of a bridge circuit illustrated generally at 25.

The wires 16 and 17 are made of a metal having a high temperature coefficient of resistance which is a characteristic of all pure metals. The wires 16 and 17 are selected so that they have a resistance at about 2° C. which, when reflected through the transformers, is positioned to balancing resistors 26 and 27 on the bridge so that the bridge is balanced with wires 16 and 17 at this temperature.

The bridge is excited from an A.C. source 29 acting through a small transformer 30, when the unit is in balance. The transformer is connected to the bridge through leads 37 and 38. The output of the bridge is connected to a phase sensitive null detector 31. The phase sensitive null detector has a reference A.C. source 32.

The null detector is selected so that when the temperature of the wires 16 and 17 is above 2° C., and the bridge is out of balance, the phase of the output signal is such that the phase sensitive null detector does not respond. When the temperature of wires 16 and 17 drops below 2° C. their resistance changes and the bridge is unbalanced. The phase of the output signal changes in a manner so that it will pass through the phase sensitive null detector 31 and enter a power amplifier 33. The power amplifier is connected to an auxiliary power source 34. The output signal of the bridge is then amplified and fed back through leads 35 and 36 which are electrically connected to leads 37 and 38, which are connected to the input of the bridge. Line 36 also forms a primary winding 41 of a current transformer 42. Power from the amplifier is thus fed back to the input of the bridge. The transformers 23 and 24 in turn supply this increased power through the secondary windings 21 and 22 of transformers 23 and 24, respectively, to the wires 16 and 17. As the voltage of the transformers increases, significant power is dissipated through the wires 16 and 17. As a result they act as heaters and warm up to nearly 2° C., and the bridge unbalance is reduced, reducing the output of the bridge. The power amplifier output is also correspondingly reduced. When the wires 16 and 17 reach 2° C., the bridge is balanced and excited with transformer 30. In this way the power amplifier will be caused to supply sufficient power to maintain the temperature of the wires 16 and 17 above freezing. Any moisture between wires 16 and 17 will be in liquid form.

Wire 16 is electrically connected through a lead 43 to a source of electro-motive force 44 and to a relay coil 45. The relay coil 45 is connected through a lead 46 to wire 17.

When the ice detector probe is in the presence of water, such water will collect between adjacent coils of wires 16 and 17. The collection of water will cause the electrical conductivity between the wires 16 and 17 to increase. When the conductivity becomes significant (water is present), a current will flow between the wires 16 and 17, through lead 43; the source of electro-motive force 44 and relay coil 45. This in turn will cause the relay coil 45 to close a set of contacts 47.

In order to form ice, two conditions must be present; the ambient temperature must be at the freezing point or below and there must be sufficient moisture or water in the air to form ice. Thus, assuming icing conditions, the temperature of wires 16 and 17 will tend to drop below the balance point of the bridge 25 and the power amplifier 33 will supply power to the bridge to maintain the wires 16 and 17 at a temperature above freezing. Moisture from the air, usually in the form of droplets, will collect between the wires. When the water has caused sufficient conductivity between wires 16 and 17, contacts 47 will close. The power from the power amplifier passing through coil 41 of transformer 42 at the same time will cause power also to flow through a pair of leads 50 and 51 which are electrically connected to a secondary winding 49 of transformer 42. With contacts 47 closed, this output can be measured at terminals 52 and 53 and used to energize a suitable signal such as an indicator light, warning bell or any desired signal. Therefore, as long as the temperature is below the freezing level and there is water between the coils of wires 16 and 17 on the probe, contacts 47 will be closed and power will be flowing from the amplifier 33 and through transformer 42 to the output terminals 52 and 53.

As the alternating current output signal appearing at terminals 52 and 53 is entirely dependent on the amount of power coming from amplifier 33 and which must be dissipated through wires 16 and 17 to maintain them at 2° C., it is conceivable that in certain conditions the output signal voltage will reach levels which are undesirably high. In order to eliminate this, a clipper comprising a resistor 54 and diodes 55 and 56 is wired as shown to prevent the output signal voltage from building up beyond a certain predetermined amount.

The wires 16 and 17 serve three purposes, they are electrodes for detecting water, inasmuch as the conductivity between the wires caused by the presence of water will result in a flow of current through the relay coil 45, closing contacts 47. The wires 16 and 17 are also temperature sensors when used in the bridge as shown and are electrical heating elements which dissipate sufficient heat to keep the probe de-iced. The sensitivity of the unit to the presence of water between wires 16 and 17 can be increased through the use of amplifiers. The relay 45 can be replaced by suitable electronic devices if desired. The output of the power amplifier 33 and transformer 42 can only reach the terminals 52 and 53 when the contacts 47 are closed due to electrical leakage between wires 16 and 17. Thus the appearance of an output signal indicates that the temperature is near freezing or below (power is being dissipated through the wires 16 and 17 to bring them to bridge balance resistance) and that there is liquid water between the two wires.

The output signal can be connected to suitable de-icing equipment, if desired.

Because of the unique system the temperature of the wires 16 and 17 can not differ greatly from the intended operating point, which is preferably slightly above freezing, and it is also assured that the insulating material of the mandrel is not greatly over heated nor significantly lower in temperature than that of the wires. The ice detector head or probe itself is significantly simplified having two wires wound as a pair and serving multiple functions.

In FIGURES 4, 5 and 6 there is an alternate form of an ice detector probe illustrated generally at 60. In this form of the probe a mandrel 61, which is made of a suitable insulating material is mounted on a control box 59 and has an internal heating element 62 running through the center thereof. The heating element is substantially coincidental with the longitudinal axis of the mandrel. The mandrel is uniformly constructed throughout its length. A first water detector portion 58 of the probe has a pair of wires 63 and 64 which correspond to wires 16 and 17, and wound along the outer surface thereof. A second temperature sensor portion 65 of the same mandrel has a single temperature sensor wire 66 wound around the mandrel. The temperature sensor wire 66 is utilized to sense the temperature of the probe and also is used to control the internal heating element. The heating element operates to maintain the entire probe at a temperaure above the freezing level.

This type of construction eliminates the ordinary problems associated with the use of a separate temperature sensor. In previous designs when the temperature and moisture sensors are of different size and shape the effect of the heat transfer to the surrounding air is different for the two sensors and error results. In this construction the effect of the internal heating element on the temperature sensor wire is the same as it is on the wires 63 and 64, which are utilized to detect the presence of water. Therefore, the wires 63 and 64 must be substantially the same temperature as the temperature sensor wire 66. The heat transfer to the surrounding air from wires 63 and 64 will also be substantially the same as the transfer from wire 66. For practical purposes, the coil spacing and size of the wires 63 and 64, and wire 66 are identical in their wound positions.

While many conventional sensing circuits can be utilized with the ice detector shown in FIGS. 4 and 5 a simplified schematic representation of a circuit which may be utilized is shown in FIG. 6. The circuit follows the circuit shown in FIG. 3 and used in the first form of the invention.

As shown, temperature sensing wire 66 is connected across a secondary winding 67 of a transformer 68. A primary winding 69 of transformer 68 is wired in a bridge circuit 70 with balancing resistors 71. The temperature sensing wire reflects resistance into the transformer as previously explained and is selected so that the bridge is in balance when the wire is at a temperature slightly above freezing or, for example, 2° C. The bridge is normally excited with an A.C. power source 72. The output of the bridge 70 is electrically connected to a phase sensitive null detector 73 which has a reference power source 74. The temperature sensor wire 66 is selected so that when the temperature of wire 66 is above 2° C., the bridge goes out of balance in such a way that the phase sensitive null detector 73 does not respond.

When the temperature of wire 66 drops below 2° C. the bridge goes out of balance in such a way that the output of the bridge passes through the null detector into a power amplifier 75 which is driven by a power source 76.

The output of the amplifier 75 is connected to heating element 62 and the power from the amplifier is used to heat the probe assembly 60. One of the leads 77 from the amplifier 75 forms a primary winding 78 of a transformer 80. The secondary winding 81 of the transformer 80 is connected through wires 82 and 83 to a pair of output terminals 84 and 85.

A set of normally open contacts 86 is located in line 83 and the signal from the transformer cannot appear at terminals 84 and 85 until these contacts are closed. The contacts 86 are controlled by a relay coil 87 which is electrically connected to a source of electromotive force 90 and then to moisture wire 63. Moisture sensing wire 64 is electrically connected to the opposite end of the relay coil.

When the electrical leakage between wires 63 and 64 increases due to the presence of water, current will flow through the relay coil and the contacts 86 will be closed. This will indicate that there is water present on the probe 60.

When there is an electrical signal appearing at terminals 84 and 85 it means that the power amplifier 75 is putting out power to energize heater 62 and that contacts 86 are closed. This in turn would be a result of the temperature wire 66 being below 2° C. and water being present between wires 63 and 64. Therefore icing conditions exist. The output signal can be connected to suitable visual or audible signals or can be connected to suitable de-icing equipment. The desired effect of maintaining the temperature sensor and the water detector winding at the same temperature under all air flow is accomplished, as it is in the first form of the invention, where the windings for the water detector serve a multiple purpose. In both ice detector heads only one probe is used.

In both ice detector heads the wires are shown in FIGS. 4 and 5 to be of rather large diameter, when compared to the mandrel upon which they are wound. It has been found that air flow removes heat from the surface of a probe in an air stream at different rates around the periphery, according to the nature of heat transfer for moving fluids. Thermal conductivity along these rather large diameter wires significantly helps to prevent temperature variations around the periphery of the mandrel. The large wires which are closely spaced tend to obstruct the flow of air over the surface of the insulating mandrel and at the same time the round wires tend to funnel the water droplets into the crevices between the wires and onto the surface of the insulating material.

These two effects act to suppress water evaporation from the probe. Evaporation of water from the probe is a problem usually encountered when the water droplets are greatly super-cooled. At times water droplets may be super-cooled to about minus 40° C., although super-cooled water in the order of minus 20° C. to 30° C. are more common. When these droplets of water strike the probe, which is maintained at a temperature above freezing, they almost immediately evaporate, particularly where the air flow is high. At low rates of icing the water may evaporate as rapidly as it collects on the ice detector head and thus the surface will tend to run dry and not indicate ice. However, with the funnel action due to large diameter round wires, this is not such a marked problem.

Because water can be trapped between the wires, it is usually desirable that the insulating material is not porous. The water will not be absorbed by the insulating material if it is not porous and drying time of the probe is not significant.

Although the wires are preferably round and of a relatively large diameter, the wires can be of any cross-sectional shape and ribbons can be utilized, either flat wound or edge wound onto the probe to accomplish the purposes of this invention.

What is claimed is:

1. A probe for utilization in connection with an ice detection system, said probe comprising a mandrel of insulating material projecting into the air stream in which ice is to be detected, heating means for maintaining the temperature of said probe above the freezing point of water, control means including temperature sensor means mounted on said probe for controlling said heating means, said temperature sensor means being mounted on the exterior surface of said probe so as to be directly exposed to said air stream, means for detecting and indicating the presence of water on the outer surface of said probe comprising a pair of wires helically wound on said probe, each coil of wire of said pair being spaced from an adjacent coil of the other wire a distance less than the diameter of the wire, and electrical current means energizable in response to an increase in conductivity between said wires caused by water on said probe.

2. The combination as specified in claim 1 wherein said temperature sensor means comprises a single wire helically wound about said probe, and said heating means comprises a heating element embedded in the mandrel along the axis thereof and adapted to heat said mandrel and said wires to maintain the temperature thereof above the freezing point of water responsive to changes in the resistance of said temperature sensor wire caused by a drop in temperature thereof below the freezing point of water.

3. A device for detecting the presence of icing conditions in an air stream comprising a probe projecting into said stream, a pair of wires helically wound onto said probe as a pair, the coils of each of said wires being spaced from the coils of the other, circuit means connected between said wires and including first indicating means which are actuated when there is water between said wires, power means electrically connected to said wires and adapted to supply electrical energy to heat said wires when the temperature of said wires drops below a certain predetermined level, and control means for said power means, said control means including means which are sensitive to the resistance change in said wires due to temperature, and which activates said power means to heat said wires when the temperature thereof drops below a predetermined level.

4. The combination as specified in claim 1 wherein said pair of water sensing wires are helically wound on a first portion of said mandrel and wherein said temperature sensor means is comprised of a single resistance wire helically wound onto a second portion of said mandrel, said resistance wire being of the same size and the wound coils thereof having substantially the same spacing as the coils of the water sensing wires.

5. The combination as specified in claim 4 wherein the mandrel is of substantially uniform cross sectional size and shape throughout its length, and said heating means includes a heating element embedded in said mandrel and extending substantially coincidental with the longitudinal axis thereof, throughout the length of said mandrel.

6. An ice detector comprising a single mandrel positioned in an air stream, first means including a pair of spaced wires helically wound as a pair on said mandrel and being directly exposed to said air stream to sense the ambient temperature thereof, second means directly exposed to said air stream including a pair of spaced wires on said mandrel to detect and indicate the presence of water between said wires, heating means including means actuable in response to said first means to maintain the wires on said mandrel at a temperature above the freezing point of water, first signal means actuable when the heating means is actuated and second signal means actuable when the second means indicates the presence of water between said wires.

7. The combination as specified in claim 6 wherein each one of said pair of wires is electrically connected across a secondary winding of a separate transformer, the primary windings of said transformer forming arms of a bridge circuit, means connected to the input of said bridge circuit to excite said bridge circuit, said bridge circuit being in balance when the temperature of said wires is a predetermined amount above the freezing point of water, said bridge having an electrical output when the temperature of said wire is below the balancing temperature, means to amplify said electrical output, said amplified electrical output being electrically connected to the input of said bridge circuit thereby to increase current flow through said transformers, said first signal means being actuable in response to electrical output from said transformer.

8. The combination as specified in claim 7 wherein said pair of wires is electrically connected to a control circuit that is energized whenever the conductivity between said wires exceeds a certain level, said control circuit controlling said second signal means, said second signal means being in series with said first signal means.

References Cited by the Examiner

UNITED STATES PATENTS 2,717,957  9/1955  Ohlheiser _____ 73—170 X
2,766,619  10/1956 Tribus et al. _____ 73—170

DAVID SCHONBERG, *Primary Examiner.*

LOUIS R. PRINCE, *Examiner.*

M. B. HEPPS, *Assistant Examiner.*